United States Patent [19]

Haas et al.

[11] 4,048,342
[45] Sept. 13, 1977

[54] PET FOOD PRESERVATION

[75] Inventors: Gerhard Julius Haas, Woodcliff Lake, N.J.; Edwin Bernard Herman, Yorktown Heights, N.Y.

[73] Assignee: General Foods Corporation, White Plains, N.Y.

[21] Appl. No.: 665,206

[22] Filed: Mar. 9, 1976

[51] Int. Cl.$^2$ .............................................. A23B 4/12
[52] U.S. Cl. .................................. 426/129; 426/326; 426/410; 426/656; 426/657; 426/805; 426/532
[58] Field of Search ............... 426/129, 324, 312, 316, 426/320, 656, 325, 326, 335, 657, 418, 419, 410, 805, 532

[56] References Cited
U.S. PATENT DOCUMENTS

| | | | |
|---|---|---|---|
| 2,518,100 | 8/1950 | Tomkins | 426/418 X |
| 3,202,514 | 8/1965 | Burgess et al. | 426/74 X |
| 3,482,985 | 12/1969 | Burgess et al. | 426/331 X |
| 3,851,080 | 11/1974 | Lugg et al. | 426/418 X |

Primary Examiner—Joseph M. Golian
Assistant Examiner—R. B. Penland
Attorney, Agent, or Firm—T. J. Carvis; D. J. Donovan; B. P. Struzzi

[57] ABSTRACT

Disclosed is a process for preparing a protein-containing food wherein the use of a carbon dioxide packaging atmosphere is found to unexpectedly increase the effectiveness of edible aliphatic acids and their edible soluble salts, especially sorbate salts, employed for antimicrobial purposes. In the preferred embodiment, an intermediate moisture pet food containing cooked meat and employing a sorbate salt at a level less than that otherwise effective against mold or bacterial growth, is packaged in an atmosphere of carbon dioxide to provide a pet food stable against mold and bacterial growth.

10 Claims, No Drawings

PET FOOD PRESERVATION

BACKGROUND OF THE INVENTION

This invention relates to proteinaceous foods and more particularly to animal foods of the shelf-stable, intermediate moisture variety.

Until the past decade animal foods were sold either in dry or canned form. The dry variety of animal foods usually contains less than 10% moisture and hence does not require sterilization procedures or refrigeration in order to render them resistant to microbial decomposition. The dry animal foods, however, are generally characterized by their low degree of palatability, it being found that as a general rule palatability is enhanced at higher moisture contents.

Canned animal foods enjoy a significant degree of palatability owing primarily to their high moisture contents, typically in the area of 75%. However, this high moisture content necessitates the sterilization of such products, generally by retorting, and refrigeration once the can is opened. Thus, canned foods involve significant processing costs and a lack of consumer convenience.

A significant contribution in the animal food field was made by Burgess, et al in U.S. Pat. No. 3,202,514. Therein is described a pasteurized intermediate-moisture animal food based principally upon proteinaceous meaty materials which product is shelf-stable and resistant to microbial decomposition without the need for sterilization, refrigeration or aseptic packaging. The meaty animal food is stabilized by "water soluble solutes", principally sugar. The function of these solutes is to bind up available water in which microorganisms grow.

While the product of Burgess, et al represented a significant contribution to the state of the art, the need for improvement in this area has been and continues to be recognized. More specifically, prior art workers have attempted to improve the palatability of such products such that they achieve parity in this area with the more palatable canned animal foods. Palatability improvement may take a variety of forms, such as the overt addition of enhancers, the elimination of negative taste factors, the utilization of greater amounts of meaty materials, and increasing the moisture content.

Among the known negative factors in intermediate moisture animal foods are certain of the stabilizers, especially at relatively high levels. Thus, elimination or reduction in the level of these stabilizers would provide a boost in palatability. Moreover, reduction of the level of stabilizers required would also reduce costs, permitting a net savings or the use of more costly, flavorful ingredients in a product to be sold at the same price. Thus, by reducing the negative factors of the stabilizers, more of the positive factors of the animal food are allowed to exert their effect.

Among the stabilizers suggested by Burgess et al. are antimycotics such as sorbate salts and sorbic acid. Preferred sorbate salts are potassium, sodium and calcium sorbate. For all of these sorbates, it is known that their activity as antimicrobials decreases with increasing pH. Thus, where pH is maintained at substantially neutral values to assure palatability of a food for dogs, the amount of sorbate must be increased to assure effective protection. And, because the sobates are perceived as negative factors, the palatability at the near neutral pH is not as good as it would otherwise be because of these increased levels of sorbates. Other stabilizers which are known are edible aliphatic acids and their edible soluble salts, such as the acid and sodium and potassium salts of caproic, caprylic and propionic acids.

Thus, there is indeed a problem in properly stabilizing mold and bacteria susceptible foods, especially pasteurized intermediate moisture animal foods of the kind discussed by Burgess et al. containing sorbate and other aliphatic acid stabilizers.

It is therefore an object of the present invention to decrease the level of caproic, caprylic, propionic or sorbic acids or their salts needed to stabilize intermediate moisture foods against microbial growth.

It is a more specific object of the present invention to decrease the level of caproic, caprylic, propionic or sorbic acids or their salts needed to stabilize proteinaceous intermediate moisture foods, especially pasteurized, meat-containing animal foods against microbial growth.

This and other objects are accomplished by the present invention which provides an improved process for preparing a food containing mold and bacteria susceptible ingredients wherein caproic, caprylic, propionic and/or sorbic acid or a non-toxic salt thereof is employed as an antimicrobial wherein the improvement comprises:

packaging the food in a substantially gas impervious packaging material, and filling the free space in the package with carbon dioxide.

DETAILED DESCRIPTION OF THE INVENTION

Central to the present invention is the discovery of an unexpected coaction between carbon dioxide and edible aliphatic acid antimicrobials, such as sorbic acid, and their soluble salts. It has been found that by packaging intermediate moisture foods, especially protein containing pet foods, in a carbon dioxide atmosphere, the activity of sorbic acid or sorbate salts as antibacterials and antimycotics is unexpectedly enhanced. Also included within the definition of this invention are the similar effects obtained by the use of carbon dioxide with other aliphatic acids and their salts having antimicrobial properties; among which are caprylic, caproic, and propionic acids and their sodium and potassium salts. This improved activity is not due to the known increase in activity with decreasing pH, because tests indicate that the pH of the product is not measurably decreased by the carbon dioxide. By virtue of the present invention, suitable bacteriological and mold stability can be obtained with lower levels of these stabilizers, thus enabling the production of mold and bacteria stable foods, such as intermediate-moisture pet foods, of improved palatability. The following discussion will relate to sorbic acid and its salts in intermediate-moisture animal foods as exemplary.

The preservation of moisture-containing foods from microbial decomposition is dependent upon a variety of factors and mechanisms whose interaction is not always fully understood. However, some basic mechanisms are generally well accepted, and can be discussed at this point to aid in understanding the invention.

Microbial growth is largely dependent upon the amount of moisture in a system available as a growth medium. The typical expression of this is the water activity, $A_w$, of a product. The $A_w$ is equal to the vapor pressure of water in the system divided by the vapor pressure of pure water at the same temperature. Theoretically, the $A_w$ of a given system can be lowered to such a degree that the water is not sufficiently available to support any microbial growth. However, to achieve the proper taste and texture for the products contemplated by this present invention, it is not possible as a practical matter to obtain these low $A_w$ values. Where the $A_w$ of the system is not lowered to the absolute point below which organisms will not grow, antimicrobials are also added. Typically, these antimicrobial agents are added to control mold growth which is not sufficiently retarded at the $A_w$ values involved.

Lastly, the provision of an acid medium of sufficiently low pH will aid in preventing microbial decomposition owing to the fact that many organisms cannot survive in such an environment. However, since the requisite pH for achieving this protection is generally so low as to result in an unpalatable, as well as detrimental, system in some cases, the utilization of pH as a primary protective is rarely employed. And, for dog foods especially, it is undesirable to lower the pH substantially below neutral.

The usual preservation mechanisms are generally based on a combination of the above principles and exert a combined stabilizing effect. Thus, for example, the prior art products generally employ sugars as water binders together with antimycotics such as sorbic acid and its salts. The disclosure of Burgess et al, U.S. Pat. No. 3,202,514, is incorporated by reference in this regard.

The product which is treated by the process of this invention preferably comprises a moisture-containing, matrix of proteinaceous materials normally capable of supporting bacteriological and/or mycotic growth, having dispersed throughout water binding ingredients sufficient to achieve an $A_w$ of below about 0.93, and further having in contact therewith an aliphatic acid, such as sorbic acid, or aliphatic acid salt antimicrobial agent. The level of the water binding ingredients and antimicrobial agent is sufficient to keep the product resistant to microbial growth and decomposition when packaged in a carbon dioxide atmosphere according to the present process. The level of antimicrobial agents and $A_w$ lowering ingredients will be balanced to achieve stability at the given moisture content. For example, it may be necessary to employ only a minor amount of antimicrobial agent where the $A_w$ of a given intermediate moisture system is at a level nearly precluding all growth. Conversely, larger amounts of antimicrobial agents may be needed in a moisture containing system wherein the $A_w$ is closer to 0.93. It is possible according to this invention to employ levels of sorbate salt or sorbic acid antimicrobials below those normally effective to prevent mycotic or bacterial growth in the absence of carbon dioxide.

Useful as water binding ingredients are any of the edible materials, either soluble or insoluble, which have the ability to tie up water to such an extent that it is no longer usable for microbial growth and propagation. Exemplary of this group of materials are sugars, polyhydric alcohols, mixtures thereof, and mixtures of alkali metal or alkaline earth salts with sugar and/or one or more polyhydric alcohols.

The polyhydric alcohols useful as preservatives in the present invention are preferably polyhydric alcohols having from 3 to 7 carbon atoms. Preferred di-hydric alcohols are 1,2-propylene glycol and 1,3-butylene glycol. Glycerine, a tri-hydric alcohol, is a very effective water binder and may be used alone or in combination with a di-hydric alcohol. Other useful polyhydric alcohols include tetritols such as erythritol or the threitols; pentitols such as ribitol or xylitol; hexitols such as sorbitol or mannitol; and heptitols such as perseitol or volemitol.

Sugars useful as water binding agents in the present invention include the reducing and non-reducing water soluble mono- and polysaccharides; e.g., pentoses such as xylose and arbinose; hexoses such as glucose, fructose or galactose; and disaccharides such as lactose, sucrose and maltose. To be effective as a bacteriostatic agent, the sugar must be water soluble and of such a low molecular weight as to be effective in increasing the osmotic pressure of the aqueous system in which it is dissolved. Preferred sugars for the purposes of this invention are sucrose, dextrose and highly converted corn syrups, especially high fructose corn syrups.

Various alkali metal and alkaline earth metal halide salts are also effective water binding agents, but these salts must be used in combination with sugars or polyhydric alcohols where the moisture level of the protein is above 15% by weight. This is due to the fact that most salts cannot be used in the products of this invention at levels of above about 4% by weight without posing health problems and seriously detracting from product palatability. Preferred salts are sodium chloride and calcium chloride. The preferred level of salt addition ranges from about 0.5 to 4.0% by weight.

The amount and choice of preservative employed in the present invention will depend on the amount of moisture present in the product and the organoleptic effect desired. Sugar may be used as the sole preservative; however, according to U.S. Pat. No. 3,202,514 it must be employed in this case at a level at least equal to the moisture content of the food. When the moisture level is in excess of about 30% by weight, it is preferred to use sugar in combination with one or more of the other preservatives or water binders disclosed hereinabove. The level of sugar which may be present in a shelf stable product of this invention will range from about 4 to 35% by weight.

Polyhydric alcohols or mixtures of polyhydric alcohols may be used as a preservative for those products where sweetness is undesirable. These materials are more efficient in preventing microbial spoilage than sugar, and hence can be used in lesser quantities. The preferred level of addition ranges from about 7 to 20% by weight. Where the polyhydric alcohol is used in combination with a salt or sugar, the preferred level of addition ranges from about 2 to 13% by weight.

The term "proteinaceous material" is meant to include proteinaceous meaty materials and non-meat protein materials. It is preferred for palatability that the products treated by the process of this invention contain proteinaceous meaty material. The term proteinaceous meaty material refers to the group consisting of meat, meat by-products and meat meal, as well as mixtures of these. The term meat is understood to apply not only to the flesh of cattle, swine, sheep and goats, but also horses, whale and other mammals, poultry and fish. The term meat by-products is intended to refer to those non-rendered parts of the carcass of slaughtered animals including but not restricted to mammals, poultry and the like and including such ingredients as are embraced by the term "meat by-products" as defined in the 1975 Official Publication of the Association of American Feed Control Officials, Inc. Likewise the term meat meal refers to the finely ground, dry rendered residue from animal tissues, including those dried residues embraced by the term "meat meal" as defined by the aforesaid Association. Indeed, the terms meat, meat by-products, and meat meal are understood to apply to all of those animal, poultry and marine products defined by said Association. In all cases where meat is employed, it is preferred that it be heated for times and at temperatures effective to pasteurize it. In the case of dry meat meals, the drying temperatures are effective for this purpose.

The proteinaceous meaty material will preferably constitute a significant portion of the products, typically greater than about 10% by weight and preferably greater than 30%. A typical range for such ingredient is about 20% to 50% by weight, but can be as high as about 80%.

Apart from the proteinaceous meaty material and the preservation system, the preferred products contemplated for treatment according to the process of this invention may optionally, though preferably, contain other proteinaceous ingredients, texturizers, vitamins, minerals, colorings, flavorants, and the like. Fat or oil may be desirably added, preferably in the source ingredients although it may be sprayed or coated on the final product.

Non-meat proteinaceous materials, i.e., protein sources other than the proteinaceous meaty material, are preferably employed to achieve a fully balanced, nutritional feed ration. Where desired, however, they can be used as the sole protein source. Typically, the protein will be derived from a vegetable protein source such as soybean, cottonseed, peanuts and the like. The protein may be present in the form of meal, flour, concentrate, isolate or the like. A preferred protein source is soy. Textured protein materials simulating natural meat can also be employed. Additional protein may be derived from milk products such as dried buttermilk, dried skimmed milk, whey, casein, and other like protein sources, such as eggs or cheese.

While these additional protein sources are generally mixed with the starting ingredients, all or part of some of these protein materials may be used to coat the otherwise formed final product.

Texturizing agents may be added at minor weight percents if desired, although it is found that the utilization of the polyhydric alcohols such as propylene glycol, butylene glycol, glycerol etc., employed as preservatives will generally be sufficient to impart the necessary plasticity and texture to the final product.

The animal food composition can also contain a binder material in an amount effective to keep the formed composition coherent and shape-retaining after cooking. The binder material may be of the proteinaceous or farinaceous variety such as egg albumin, wheat flour, corn flour and the like or may be a polymeric carbohydrate binder such as sodium carboxymethylcellulose, gelatin, alpha-cellulose, and the like. The binder is preferably employed in higher moisture products (e.g. above about 30% water) at from about 3% to 10% by weight and most preferably from about 5 to 8%.

The above ingredients are then processed according to techniques known to the art. These procedures involve pasteurizing the meat alone or with the other ingredients, shaping the product and packaging. Typical of the known procedures is that described in U.S. Pat. No. 3,202,514. The pasteurization necessary when meats are employed, not only reduces the bacterial content of the material, but also eliminates natural enzyme activity present in either the meaty or other ingredients.

The improvement provided for by the present invention calls for sealing the package having substantially all void spaces therein filled with carbon dioxide. If desired, the product can be degassed and/or flushed with carbon dioxide prior to packaging. To be effective over reasonable periods of storage, the packaging material must be substantially impervious to gases such as water vapor, carbon dioxide and oxygen. Typical of suitable packaging materials are polyethylene-coated aluminum foil and polyvinylidene chloride-coated polyethylene. Other suitable materials are also known to those skilled in the art, as is the equipment capable of feeding the food into such packages, flushing the package with carbon dioxide as by probe within the package during filling, and sealing the packages such as by heat sealing.

The following example is presented for the purpose of further explaining and illustrating the present invention and is not to be taken as limiting in any regard. Unless otherwise indicated, all parts and percentages are by weight.

EXAMPLE

An intermediate moisture dog food having an $A_w$ of about 0.86–0.87 was prepared from the following formulation:

| Meat Slurry Formula | | |
|---|---|---|
| Beef Trims | 10.0 | Parts |
| Beef Tripe | 24.0 | Parts |
| Corn Syrup | 3.0 | Parts |
| Emulsifier | 0.5 | Parts |
| | 37.5 | Parts |
| Dry Ingredients | | |
| Soy Flakes | 33.0 | Parts |
| Sucrose | 16.5 | Parts |
| Soy Hulls | 2.0 | Parts |
| Dicalcium Phosphate | 3.1 | Parts |
| Whey | 1.5 | Parts |
| Salt | 1.2 | Parts |
| Vitamins | 0.1364 | Parts |
| Color | 0.0234 | Parts |
| | 57.4598 | |

To prepare the dog food, the beef trims and tripe were chopped in frozen condition and extruded through a one-eighth inch die using a Hobart grinder. This ground material was then placed in a jacketed sigma blade mixer and the corn syrup and emulsifier were added. The resulting slurry was thoroughly mixed as it was heated to about 200° F. The listed dry ingredients were then batched and pre-mixed in a Hobart mixer. The resulting uniform dry mix was then added to the heated slurry and the total mix heated to about 180° F under constant agitation. This total mix was then transferred to a flat tray for cooling to room temperature, packed in seal polymer film bags, and placed in 0° F storage for at least 24 hours. The samples remained frozen until use, at which time they were thawed.

The dog food, thus prepared, was employed in the three following experiments using the indicated inocula and with the following results:

a. Staphylococcus Inoculum $1.5 \times 10^5$ organisms/g

| Time (Days) | Count-Organisms/g | | | |
|---|---|---|---|---|
| | Control | $CO_2$ | 0.3% Sorbate | 0.3% Sorbate + $CO_2$ |
| 3 | $6 \times 10^5$ | $5 \times 10^5$ | $1 \times 10^5$ | $2 \times 10^5$ |
| 7 | $2 \times 10^7$ | $4 \times 10^5$ | $3 \times 10^4$ | $6 \times 10^4$ |
| 27 | — | $8 \times 10^7$ | $9 \times 10^5$ | $8 \times 10^3$ | b. Inoculation of A. glaucus, var. ruber, spore suspension, approximately 50,000 to 100,000 organisms per g.

In the $CO_2$ atmosphere the mold did not grow in 2 months at 0.3% or 0.1% sorbate, and grew in 38 days in the absence of sorbate. In air, growth occurred in 7 days at 0.3% or 0.1% sorbate. (In this experiment there was an anomaly: no growth was observed in air, without sorbate, after two months.)

c. Staphylococcus Inoculum $2 \times 10^5$ organisms/g

| Time (Days) | Control | $CO_2$ | 0.1% Sorbate | 0.3% Sorbate | 0.1% Sorbate +$CO_2$ | 0.3% Sorbate +$CO_2$ |
|---|---|---|---|---|---|---|
| 6 | $1 \times 10^8$ | $2 \times 10^6$ | $7 \times 10^7$ | $4 \times 10^6$ | $1 \times 10^5$ | $1 \times 10^5$ |
| 16 | — | $8 \times 10^7$ | $2 \times 10^7$ | $3 \times 10^7$ | $1 \times 10^6$ | $1 \times 10^5$ |

The foregoing description is presented for the purpose of enabling those skilled in the art to understand and practice the present invention, and does not attempt to describe all modifications and variations thereof which will become apparent to those skilled in the art upon reading it. However, all such modifications and variations are meant to be included within the invention, the scope of which is defined by the following claims.

What is claimed is:

1. In a method for preparing an intermediate-moisture food comprising pasteurized meat and containing an antimicrobial agent selected from the group of linear aliphatic acids, their edible salts, and combinations thereof, the improvement comprising:
    packaging said food in a substantially gas impervious packaging material, and filling the free space in the package with carbon dioxide,
    said food containing a level of said antimicrobial agent which is ineffective in the absence of the carbon dioxide to prevent microbial growth, but effective to prevent microbial growth when the food is packaged in carbon dioxide.

2. A method according to claim 1 wherein the linear aliphatic acid is selected from the group consisting of sorbic, caproic, caprylic, propionic and combinations.

3. A method according to claim 2 wherein the microbial growth referred to is mold growth.

4. A method according to claim 2 wherein the microbial growth referred to is bacterial growth.

5. A method according to claim 3 wherein the intermediate-moisture product is a pet food and has a moisture content of from about 15 to about 50% by weight of the total composition, an $A_w$ of from about 0.5 to about 0.93 and a pH of from about 3.5 to about 8.0.

6. A method according to claim 5 wherein the pet food is a full-feeding, nutritionally-balanced dog food containing meat and vegetable protein.

7. A method according to claim 6 wherein the linear aliphatic acid comprises sorbic acid.

8. A packaged pet food product prepared according to the method of claim 5.

9. In a method for preparing an intermediate-moisture proteinaceous food containing non-meat proteinaceous materials as the sole protein source and containing an antimicrobial agent selected from the group of linear aliphatic acids, their edible salts, and combinations thereof, the improvement comprising:
    packaging said food in a substantially gas impervious packaging material, and filling the free space in the package with carbon dioxide,
    said food containing a level of said antimicrobial agent which is ineffective in the absence of the carbon dioxide to prevent microbial growth, but effective to prevent microbial growth when the food is packaged in carbon dioxide.

10. A method according to claim 9 wherein the food is a pet food.

* * * * *